(No Model.) 2 Sheets—Sheet 1.

M. SPARMO.
CAR FENDER.

No. 552,789. Patented Jan. 7, 1896.

WITNESSES:
John A. Rennie
J. Fred Acker

INVENTOR
M. Sparmo
BY
Munn & Co
ATTORNEYS.

(No Model.) 2 Sheets—Sheet 2.

M. SPARMO.
CAR FENDER.

No. 552,789. Patented Jan. 7, 1896.

WITNESSES: John A Rennie

INVENTOR M. Sparmo
BY Munn & Co
ATTORNEYS.

UNITED STATES PATENT OFFICE.

MARIANO SPARMO, OF NEW YORK, N. Y.

CAR-FENDER.

SPECIFICATION forming part of Letters Patent No. 552,789, dated January 7, 1896.
Application filed July 30, 1895. Serial No. 557,605. (No model.)

*To all whom it may concern:*

Be it known that I, MARIANO SPARMO, a subject of the King of Italy, residing at New York city, in the county and State of New York, have invented a new and useful Improvement in Car-Fenders, of which the following is a full, clear, and exact description.

My invention relates to an improvement in car-fenders, and the object of the invention is to provide a fender of durable, light, and economic construction, and capable of being applied to any car without interfering with the brake mechanism or motor that may be employed to propel the car.

Another object of the invention is to provide a fender which when not in use may be conveniently slid beneath the car so as to be practically concealed, and which will occupy when given that position but little space in advance of the car, enabling the car to be readily stored, the cars equipped with the fender being capable of being placed close together.

Another and the prime feature of the invention consists in so constructing the fender that an object falling on the bed of the fender will instantly set mechanism in action, which mechanism will throw upward the forward end of the fender and prevent the object from rolling off from the bed.

Another object of the invention is also to provide side and guard rails for the fender, which will operate in conjunction with the forward end when the latter is raised.

Another object of the invention is to provide for locking the fender either in its extreme outer position or in an intermediate position, as may be required.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
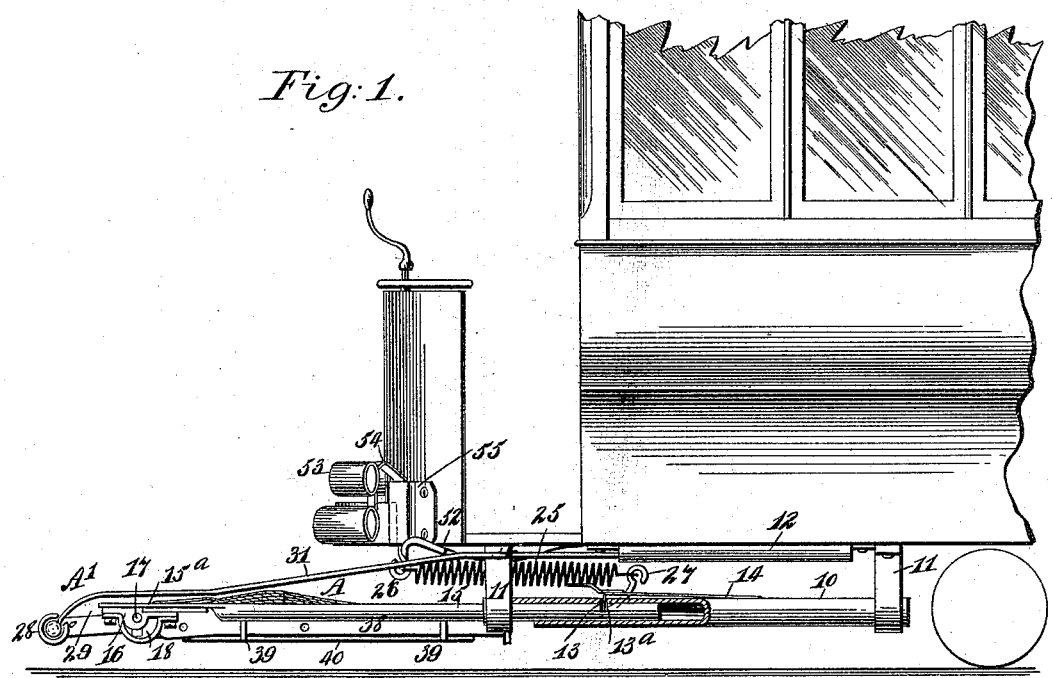
Figure 2:
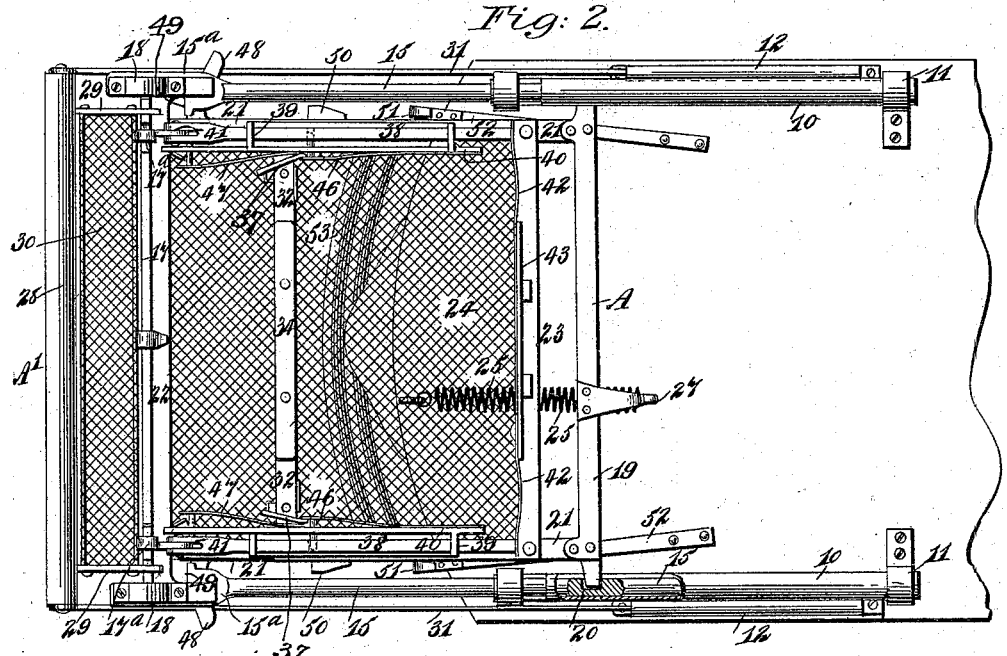
Figure 3:
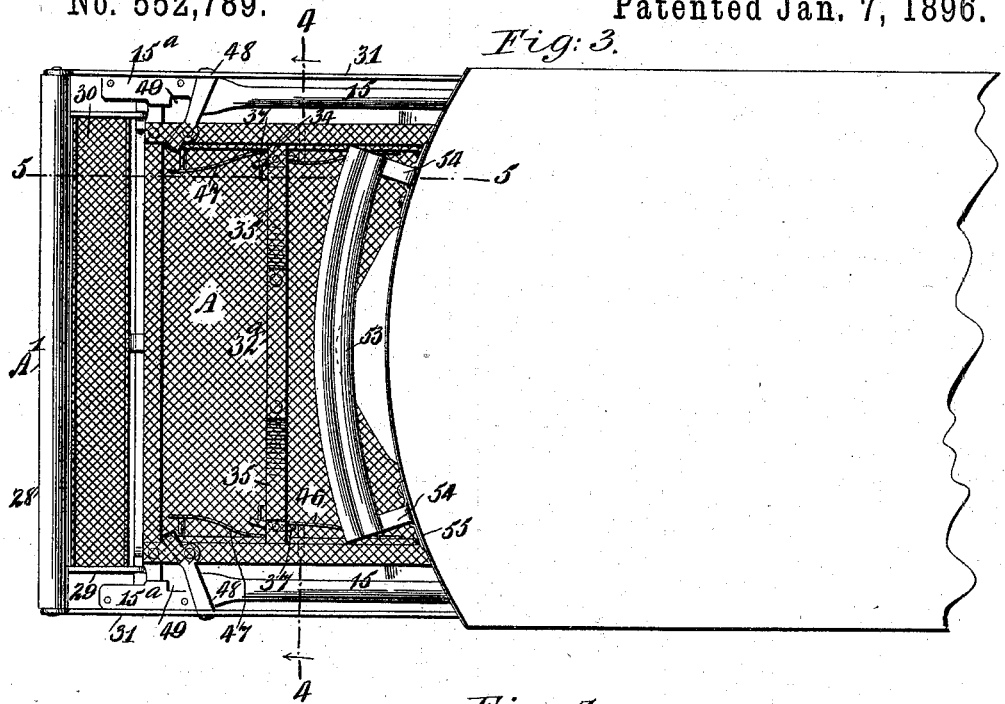
Figure 4:
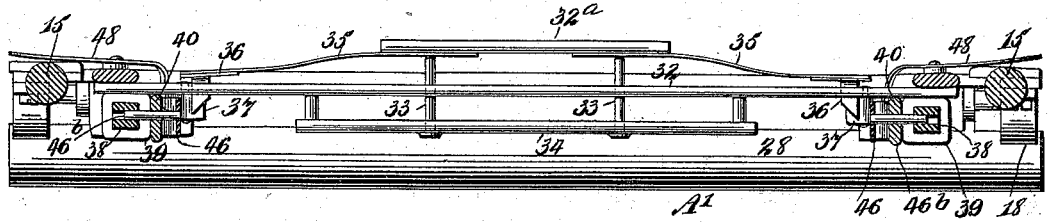
Figure 5:
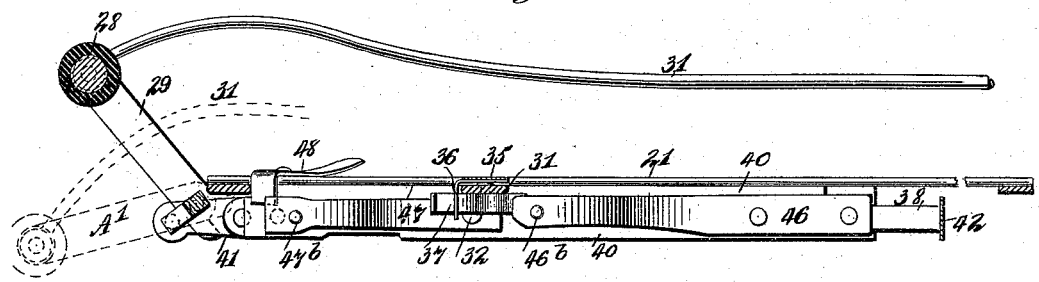
Figure 6:
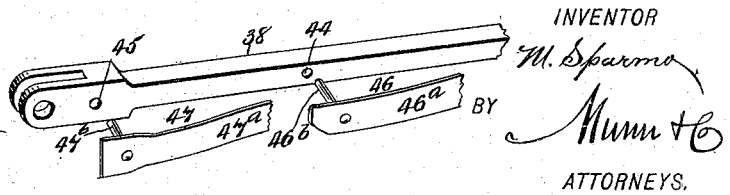

Figure 1 is a side elevation of the front portion of a car and the improved fender applied thereto, a portion of the fender being broken away. Fig. 2 is a bottom plan view of the fender in its outer position. Fig. 3 is a plan view of the fender in its outer or working position. Fig. 4 is a transverse section on an enlarged scale, the said section being taken practically on the line 4 4 of Fig. 3. Fig. 5 is a longitudinal section through the fender, taken substantially on the line 5 5 of Fig. 3; and Fig. 6 is a detail view of one of the side bars of the fender-frame and locking devices operating in conjunction therewith.

In carrying out the invention cylinders 10 are supported from the bottom portion of the body of the car and the platform, one at each side of the car, hangers 11 being employed for the purpose, and the hangers are preferably of angular construction, their horizontal members extending outward beyond the plane of the side of the bottom of the car, the cylinders being at the outer end of the hangers.

Above each main cylinder 10 a smaller cylinder 12 is preferably secured directly to the bottom of the car, as shown best in Fig. 1. Each main cylinder is provided somewhere near the center with a slot 13 in its upper surface, and a spring locking-latch 14 is secured to each of the main cylinders, the heads of the latches being adapted to enter the aforesaid openings 13.

A rod 15 is held to slide in each of the main cylinders 10, and these rods are adapted as carriers for the fender A to be hereinafter described. Each of the carrier-rods 15 is provided with a flattened outer extremity $15^a$, and upon the under face of the flattened surface of each of the carrier-rods a box 16 is secured, and the ends of a crank-shaft 17 are journaled in these boxes, the said shaft having two crank-arms $17^a$, one near each of its ends, as shown best in Fig. 2, and below each box a shoe runner 18, or its equivalent, is secured, adapted to contact with the ground if the fender should be pressed downward under a great weight.

The frame of the fender A is best shown in Fig. 2, and it consists of a back cross-bar 19, the ends of which enter longitudinal slots in the sides of the main cylinders 10, and likewise enter recesses 20 in the carrier-rods 15, so that the fender is compelled to move with these rods. Side bars 21 are secured to the rear of the cross-bar 19, and these side bars are connected also by a cross-bar 22, this latter bar being secured at its extremities in any suitable or approved manner to the outer ends of the carrier-rods 15, and the frame of the fender is completed by adding a third cross-bar 23 near the inner or rear cross-bar, and the said frame is covered by a bed 24 of a yielding material, such as woven wire or the like, extending preferably from the front cross-bar 22 to the intermediate cross-bar 23.

When the fender is in its outer position it is so held by the latches 14 entering suitable slots 13ª made in the carrier-rods, which slots register with the openings 13 in the main cylinders, as shown in Fig. 1. When the fender is released from all locking devices, after it has been pushed in beneath the car-platform, it will be thrown out to its working position automatically by means of a spring 25, which is secured to the forward portion of the platform by means of an eye 26 or its equivalent, and it is attached at its opposite end to the inner cross-bar 19 of the fender-frame through the medium of a second eye 27.

The fender is provided with an auxiliary pivoted front section A', and this section of the fender comprises a front cushioned cross-bar 28, preferably of tubular form, side bars 29 connected with the front cushioned bar near its ends, and the said side bars or arms are attached firmly to the rock-shaft 17 adjacent to its crank-arms 17ª, and the frame of the pivoted fender-section just described is provided with a panel 30, constituting a bed, and a rod 31, adapted to constitute a rail, is secured to each extremity of the front or cushioned bar of the auxiliary or pivoted fender-section, and these rods are carried rearward, being held to slide in the small upper cylinders 12, and when the auxiliary or pivoted fender-section is carried to an upper position, as shown in Fig. 5, it will prevent any person from rolling off at the front of the fender, while the rods 31 will constitute guards or rails for the side portions of the fender.

The auxiliary or front section A' of the fender may stand normally in a horizontal position, or it may be given the downward inclination shown in dotted lines in Fig. 5. The front or pivoted section of the fender is designed to be carried automatically to its upper position the moment that the bed of the body of the fender receives an object, and the mechanism by means of which this result is obtained is as follows: At or near the center of the fender-frame a cross-bar 32 is carried from one side piece to the other, being secured to the frame, and the central cross-bar is provided with apertures, one at each side of the center. A short trip-bar 32ª is placed over the central portion of the cross-bar 32, and rods 33 are secured to the said trip-bar and are passed loosely through the openings in the cross-bar and likewise through corresponding openings in a guide-bar 34 supported from the lower portion of the central cross-bar, and the lower ends of the guide-rods 33 are preferably headed, since springs 35 are in constant engagement with the under face of the trip-bar at its ends to force the same upward, as shown in Fig. 4, in which the bed of the fender is omitted, and the trip-bar in its upper position will cause a bulge in the bed, as shown in Fig. 1. The springs are secured to the trip-bar, and their upper ends are attached each to the horizontal member of an angular trip-arm 36, the vertical members of the arms being made to extend downward below the central cross-bar 32, as is best shown in Fig. 4. The trip-arms have a lateral rocking motion, being pivoted on the central cross-bar. The vertical members of each trip-arm are respectively in engagement with a release-lever 37, each being mounted on a vertical pivot carried by the respective ends of the bar 32, as best shown by full lines in Fig. 3 and dotted lines in Fig. 4. Two slides 38 respectively have longitudinal movement below each side bar of the fender-frame. These slides are in the nature of connecting-bars and are bifurcated at their forward ends, being preferably rectangular in cross-section, and are supported in boxes or bearings 39 attached to the fender-frame in any approved manner. A guide-bar 40 is secured to the inner face of the boxes at each side of the fender, the guide-bars being parallel with the slides 38, and the forward end of each slide is connected by a link 41 with a crank-arm 17ª on the crank-shaft 17, while the inner ends of the slides bear against springs 42 attached to a support 43 carried by the rear cross-bar 23 of the fender-frame, as shown in Fig. 2. These springs act constantly to push the slides in a forward direction. Latches, however, are provided for the slides to hold them in predetermined positions relative to the front and rear of the fender, and to that end each slide is provided with two openings 44 and 45, preferably extending through from side to side, as shown in Fig. 6, one of the openings being near the forward end of a slide and the other near its center, and two latches 46 and 47 are provided for each slide and these latches are secured to the guide-bars 40.

The latch 46 consists of a spring-body 46ª secured at its rear end, the forward end being free and provided with a pin 46ᵇ, which is adapted to enter and to normally remain within the opening 44 in the guide-bar to which the latch belongs. The forward latch is of the same construction, embracing a spring-body 47ª and a pin 47ᵇ, the latter being adapted to enter and normally remain in the opening 45 in the guide-bar, as shown in Figs. 2 and 4.

The pins 46ᵇ and 47ᵇ are adapted to enter respectively the openings 44 and 45 in the slides; but the latches 46 may be carried out of engagement with the slides through the medium of the release-levers 37, which engage with the outer face of the free ends of the bodies of the latches, as shown in Fig. 5. The forward latches 47 may likewise be released from engagement with the slides by means of angle-levers 48, which are pivoted on the upper faces of the flattened forward ends of the carrier-rods 15 and extend downward to engage with the free ends of the body portions of these latches, as shown in Figs. 3 and 5.

Recesses 49 are made in the inner faces of the flattened forward ends of the carrier-rods, as shown best in Fig. 3, and projections 50 are made upon the sides of the fender-frame at or near the central portions of the side bars, as shown in Fig. 2. The recesses 49 and projections 50 are adapted to be engaged by hooks 51 provided with spring-shanks 52, the latter being secured to the under face of the car-platform, and giving the hooks a tendency upward, and when the fender is to be forced to the full extent of its inner movement it will be so held by the hooks 51 entering the recesses 49 in the carrier-rods. If it is desired to carry the fender inward but half-way these hooks will then engage with the side projections 50 of the fender. In either event the spring 25 connected with the fender and the platform of the car will be placed under tension, so that as soon as the hooks are disconnected from their keepers the spring will act to force the fender outward.

When in operative adjustment the fender is carried as shown in Fig. 1; but it may be desired at times to hold it at an inner position—as, for example, when the car is out of use and in the sheds. In such event the spring-hooks 51 become useful to hold the fender inward, and they may be released to permit the fender to move forward by pushing the latter slightly inward, whereupon the springs will lift the hooks and release the fender. At other times the hooks 51 are not used.

When the fender is set the latches 46 will have entered the openings 44 in the slides 38, as shown in Fig. 2, and these latches will be in engagement with the release-levers 37. The forward latches 47 will at this time have been carried out of the openings 45 in the slide they are intended to enter, and the pins of the latches will bear against the plain surfaces of the slides, as shown in Figs. 2 and 3, since in carrying the slides back to effect an engagement with the latches 46 the openings 45 receiving the latches 47 will be carried considerably rearward from the pins of the said latches.

The forward releasing-levers 48 will be at this time substantially transversely of the fender-frame, or with their vertical members somewhat in engagement with the guide-bars 40, or between the guide-bars and the body portion of the said forward latches. In carrying the slides rearward the forward pivoted section A' of the fender will have been straightened out or brought to its normal position, and the springs 42 at the rear of the fender will be placed under tension.

In the event the fender should strike an object—a man, for example—the object would be forced to fall on the bed of the main fender. In so falling the trip-bar 32$^a$ at the bulged portion of the body of said fender would be depressed and the springs 35 would then act to move the trip-arms 36 in a manner which will press the release-levers 37 outward at their free ends, and consequently these release-levers would force the free ends of the rear latches 46 inward, drawing the pins 46$^b$ from engagement with the slides. The springs 42 will then act upon the slides so as to force them forward, and the crank connection between the shaft 17, to which the forward section of the fender is attached, and the slides will compel the said forward section to rise to a substantially vertical position, forming a barrier at the forward end of the fender and preventing a person from rolling off at that point, while the guide-rods 31 or railings connected with the pivoted forward section of the fender will be carried up to the position shown in Fig. 5, protecting the sides of the fender, and the forward movement of the slides will prevent the latches at the rear from again entering them, since the openings will be in advance of the latches; but the openings at the forward end of the slides will have been brought in registry with the pins of the forward latches and they will enter these openings automatically, and thus lock the pivoted fender-section in its upper position.

In restoring the parts to their normal position, the forward release-levers are operated manually to carry the forward latches 47 out of engagement with the slides 38, and the forward section of the fender is thereupon carried downward to its proper position by manual force causing the slides to move rearward and to be caught and held by the rear set of latches 46.

A buffer is preferably employed to prevent persons being injured by striking the front of the dashboard and projections therefrom, and the said buffer preferably consists of tubular cushions 53 arched to correspond to the cross-sectional shape of the dash, the cushions being secured at predetermined intervals apart to brackets 54, which are introduced into sockets 55 made on the dash.

Having thus described my invention, I claim as new and desire to secure by Letters Patent—

1. A fender, consisting of a body section a front pivoted section capable of assuming a position at an angle to the body section, a rock shaft operating the pivoted section, and actuated slides operating the said rock shaft and controlled from the body portion of the fender, as and for the purpose set forth.

2. A fender, the same comprising a body section, a forward pivoted section capable of assuming a position at an angle to the body section, a rock shaft operating the pivoted fender section, spring-controlled slides operating the said rock shaft, latches engaging with the said slides, and a trip mechanism operating to release the latches and operated from the body section of the fender, as and for the purpose set forth.

3. A fender, the same comprising a body portion, a forward pivoted portion capable of assuming a position at an angle to the body portion, a rock shaft operatively connected to the forward pivoted section, a longitudinally reciprocating slide operating the rock shaft, a spring continually pressing the slide and releasable means for retaining the spring and also the slide, substantially as described.

4. In a car fender, the combination, with the body portion adapted to have sliding movement beneath the car, and a forward extension of the body of the fender, having pivotal connection with said body, of a rock shaft to which the extension is attached, slides connected with and operating the rock shaft, latches adapted for engagement with the said slides, release levers engaging with one set of latches, and a trip mechanism operated by a depression of the body portion of the fender and operating the said release levers, and a second set of release levers adapted to control the releasing movement of the second set of latches, as and for the purpose specified.

5. In a car fender, the combination, with a body section capable of spring controlled sliding movement, and means for holding the body in a predetermined position, of a cushioned fender section pivotally connected with the body section of the fender, a mechanism, substantially as described for carrying the pivoted fender section at an angle to the body, said mechanism being operated by a depression of the upper surface of the body, and guards extending from the ends of the pivoted section over the sides of the body section of the fender, and guides in which the said guards have movement, as and for the purpose set forth.

6. The combination, with a car, tubular supports suspended from the car, carrier rods having sliding movement in the said supports, a fender connected with the said carrier rods, and a spring exerting outward tension on the fender, of an auxiliary fender pivotally attached to the forward end of the body fender and capable of assuming a position at an angle thereto, guards attached to the ends of the auxiliary fender, extending over the sides of the main fender and having guided movement beneath the car, locking devices carried by the car, and keepers provided on the fender for engagement with the locking devices, a rock shaft actuating the auxiliary fender, spring-controlled slides operating the said rock shaft and operated by the depression of the body fender, spring-controlled latches adapted for engagement with the slides, and release levers engaging the said latches, as and for the purpose specified.

7. In a car fender the combination of a mounted body portion, a pivoted forward section carried by the body portion, means for actuating said pivoted forward section, two rods respectively connected to the pivoted forward section and sleeves carried by the car and in which the rods respectively slide, the rods forming side guard rails thrown into operative position by the pivoted forward section substantially as described.

8. In a car fender, the combination of a mounted body portion, a pivoted forward section connected to the body portion, a rock shaft whereby the pivoted section is connected to the body portion, two slides connected with the rock shaft two alternately operating retaining devices for the slides, means for automatically releasing the retaining devices, and a spring for actuating the slides, substantially as described.

9. In a car fender, the combination of a mounted body portion, a pivoted forward section carried by the body portion, and means for operating said pivoted portion, the same comprising an actuated slide and alternately operating retaining devices therefor, substantially as described.

10. In a car fender, the combination of a mounted body portion, a pivoted forward portion carried by the body portion, a slide connected with the pivoted portion and serving to swing the same, means for actuating the slide, and two alternately operating retaining devices, substantially as described.

11. In a car fender, the combination of a mounted body portion, a pivoted forward portion, means for actuating said forward portion and two alternately operated retaining devices for controlling said means substantially as described.

12. In a car fender, the combination of a mounted body portion, a pivoted forward portion, a slide connected with the pivoted portion, two alternately operating retaining devices for the slide, a lever co-operating with one retaining device, a second lever co-operating with the remaining retaining device, and trip mechanism actuating said second lever, substantially as described.

13. In a car fender, the combination with a car, of two sleeves, a rod movable in each sleeve, a fender body portion carried by the rods, a forward portion pivotally carried by the front extremity of body portion and normally extending horizontally, and means for operating said pivoted forward portion to rise above the body portion, the said means being carried by the body portion, substantially as described.

14. In a car fender the combination with a car, of two sleeves, a slide movable in each sleeve, a fender body portion carried by the slides, a pivoted forward portion carried by the body portion, means for operating the pivoted portion, two additional sleeves carried by the car, and two rods respectively pivoted to the pivoted forward portion and sliding in the sleeves, substantially as described.

15. In a car fender, the combination of a mounted body portion, a pivoted forward portion carried by the body portion, a slide connected with the pivoted portion, a retaining device for the slide, and a lever pivoted on the body portion and capable of movement in and out of engagement with the retaining device, substantially as described.

16. In a fender, a mounted body portion, a forward portion pivotally carried thereby, a longitudinally reciprocating slide held in the body portion, a spring capable of continually pressing the slide, the slide being connected to operate the forward portion, and a releasable retaining device for restraining the operation of said spring and also the slide, substantially as described.

MARIANO SPARMO.

Witnesses:
J. FRED ACKER,
C. SEDGWICK.